(12) United States Patent
Grant et al.

(10) Patent No.: US 11,170,330 B2
(45) Date of Patent: Nov. 9, 2021

(54) WORKPLACE RISK DETERMINATION AND SCORING SYSTEM AND METHOD

(71) Applicant: Safesite Solutions, Inc., San Francisco, CA (US)

(72) Inventors: Peter Grant, San Francisco, CA (US); David Fontain, San Francisco, CA (US); Leigh Appel, San Francisco, CA (US); Emilio Figueroa, San Francisco, CA (US)

(73) Assignee: SAFESITE SOLUTIONS, INC., San Francisco, CA (US)

( * ) Notice: Subject to any disclaimer, the term of this patent is extended or adjusted under 35 U.S.C. 154(b) by 0 days.

(21) Appl. No.: 16/714,558

(22) Filed: Dec. 13, 2019

(65) Prior Publication Data

US 2021/0182748 A1 Jun. 17, 2021

(51) Int. Cl.
*G06Q 10/00* (2012.01)
*G06Q 10/06* (2012.01)
*G06Q 10/04* (2012.01)

(52) U.S. Cl.
CPC ......... *G06Q 10/0635* (2013.01); *G06Q 10/04* (2013.01); *G06Q 10/0631* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | |
|---|---|---|
| 6,931,387 B1 | 8/2005 | Wong et al. |
| 7,363,193 B2 | 4/2008 | Jacobs et al. |
| 7,461,078 B2 | 12/2008 | Vogel |
| 8,041,587 B2 | 10/2011 | Watson et al. |
| 8,712,827 B2 | 4/2014 | Mollicone et al. |
| 8,825,632 B2 | 9/2014 | Vogel et al. |
| 9,013,297 B1 | 4/2015 | Dey et al. |
| 9,177,458 B1 | 11/2015 | Dey et al. |
| 9,329,751 B2 | 5/2016 | Bardhan |
| 9,486,027 B2 | 11/2016 | Dey et al. |
| 9,538,800 B2 | 1/2017 | Dey et al. |
| 9,538,801 B2 | 1/2017 | Dey et al. |
| 2004/0128175 A1 | 7/2004 | Andrzejewski et al. |
| 2006/0200375 A1* | 9/2006 | Ohnemus ........... G06Q 10/0639 705/7.38 |

(Continued)

FOREIGN PATENT DOCUMENTS

| | | |
|---|---|---|
| CA | 2511837 | 7/2004 |
| CA | 2679546 | 9/2008 |

(Continued)

OTHER PUBLICATIONS

Ramesh, R., et al. "Hazard identification and risk assessment in automotive industry." International journal of ChemTech research 10.4 (2017): 352-358. (Year: 2017).*

(Continued)

*Primary Examiner* — Alan S Miller
*Assistant Examiner* — Mustafa Iqbal
(74) *Attorney, Agent, or Firm* — DLA Piper LLP (US)

(57) ABSTRACT

A system and method for the collection and processing of workplace, public and private data to predict and score risk incident frequency and severity for a commercial client. In one embodiment, the risk assessment may be performed using one or more machine learning techniques.

11 Claims, 7 Drawing Sheets

(56) References Cited

U.S. PATENT DOCUMENTS

| | | | |
|---|---|---|---|
| 2007/0202483 A1* | 8/2007 | Castelli | G09B 3/00 |
| | | | 434/350 |
| 2009/0012831 A1 | 1/2009 | Grant et al. | |
| 2009/0089108 A1 | 4/2009 | Angell et al. | |
| 2009/0138316 A1* | 5/2009 | Weller | G06Q 10/063 |
| | | | 705/7.11 |
| 2009/0287525 A1 | 11/2009 | Cangelosi | |
| 2010/0287164 A1 | 11/2010 | Vogel et al. | |
| 2011/0022421 A1 | 1/2011 | Brown et al. | |
| 2012/0010488 A1 | 1/2012 | Henry et al. | |
| 2013/0282410 A1* | 10/2013 | Petersen | G06Q 10/0635 |
| | | | 705/4 |
| 2016/0148132 A1 | 5/2016 | Aqlan et al. | |
| 2017/0032255 A1 | 2/2017 | Chandra et al. | |
| 2017/0091879 A1 | 3/2017 | Kanner et al. | |
| 2018/0151049 A1 | 5/2018 | Chong et al. | |
| 2018/0157932 A1* | 6/2018 | Gu | G06K 9/6227 |
| 2019/0138995 A1 | 5/2019 | Currin et al. | |
| 2019/0391707 A1* | 12/2019 | Ristow | G06F 3/0482 |

FOREIGN PATENT DOCUMENTS

| | | |
|---|---|---|
| EP | 2238476 | 10/2010 |
| KR | 20100078993 A | 7/2010 |
| WO | 2002021389 | 5/2002 |
| WO | 2004061738 | 7/2004 |
| WO | 2005041145 | 5/2005 |
| WO | 2017152231 | 9/2007 |
| WO | 2009086636 | 7/2009 |
| WO | 2009146510 | 12/2009 |
| WO | 2013039911 | 3/2013 |
| WO | 2013142900 | 10/2013 |

OTHER PUBLICATIONS

Doherty, Paul J. et al., entitled, "Space-time analyses for forecasting future incident occurrence: a case study from Yosemite National Park using the presence and background learning algorithm," International Journal of Geographical Information, Science, (Mar. 25, 2014), vol. 28, No. 5, pp. 910-927.

Ahola, Terhi et al., entitled, "A spatio-temporal population model to support risk assessment for emergency response decision-making," International Journal of Geographical Information Science, (Jul. 17, 2007), 22 pp.

Mattis, Gene et al., entitled, Predicting and Preventing Severe Workplace Injuries for Risk Management Professionals; A PMA Companies Thought Leadership Publication, (Apr. 2012), 8 pp.

* cited by examiner ined to a system and method for the collection and processing of workplace and public data to predict and score risk incident frequency and severity for a commercial client.

WORKPLACE RISK DETERMINATION AND SCORING SYSTEM AND METHOD

FIELD

The disclosure relates to a system and method for the collection and processing of workplace and public data to predict and score risk incident frequency and severity for a commercial client.

BACKGROUND

Currently, it is desirable to be able to, for a commercial client, monitor real-time workplace hazards and mitigate risk probability from actionable insights. Traditional approaches cannot deliver these detailed predictive insights and can't satisfy emerging customer expectations.

There are numerous reasons for classifying entities. Binary classification indicates whether or not an entity is in a particular class. Classification can be done based on the publications of an entity. The presence or absence of an indicator might be digitally stored as a binary value of 1 if said indicator is present and a binary value of 0 if said indicator is not present. Prior art systems have assigned different weights to different indicators. This recognizes that some indicators are stronger than others. It has been discovered, however, that when there is a large number of low weight indicators in an entity's publications, prior art systems tend to over predict the probability that an entity is in a particular class. There is a need, therefore, for an artificial intelligence system for training a classifier that will not over predict due to large numbers of low weight indicators and that can be used to assess the risk probabilities for workplace hazards.

There are various existing systems and methods that perform some type of risk assessment for workplace hazards, but none of the system and methods can accurately determine the probability of a workplace risk and the consequence/severity of the workplace risk and it is to this end that the disclosure is directed.

DETAILED DESCRIPTION OF ONE OR MORE EMBODIMENTS

Figure 1:
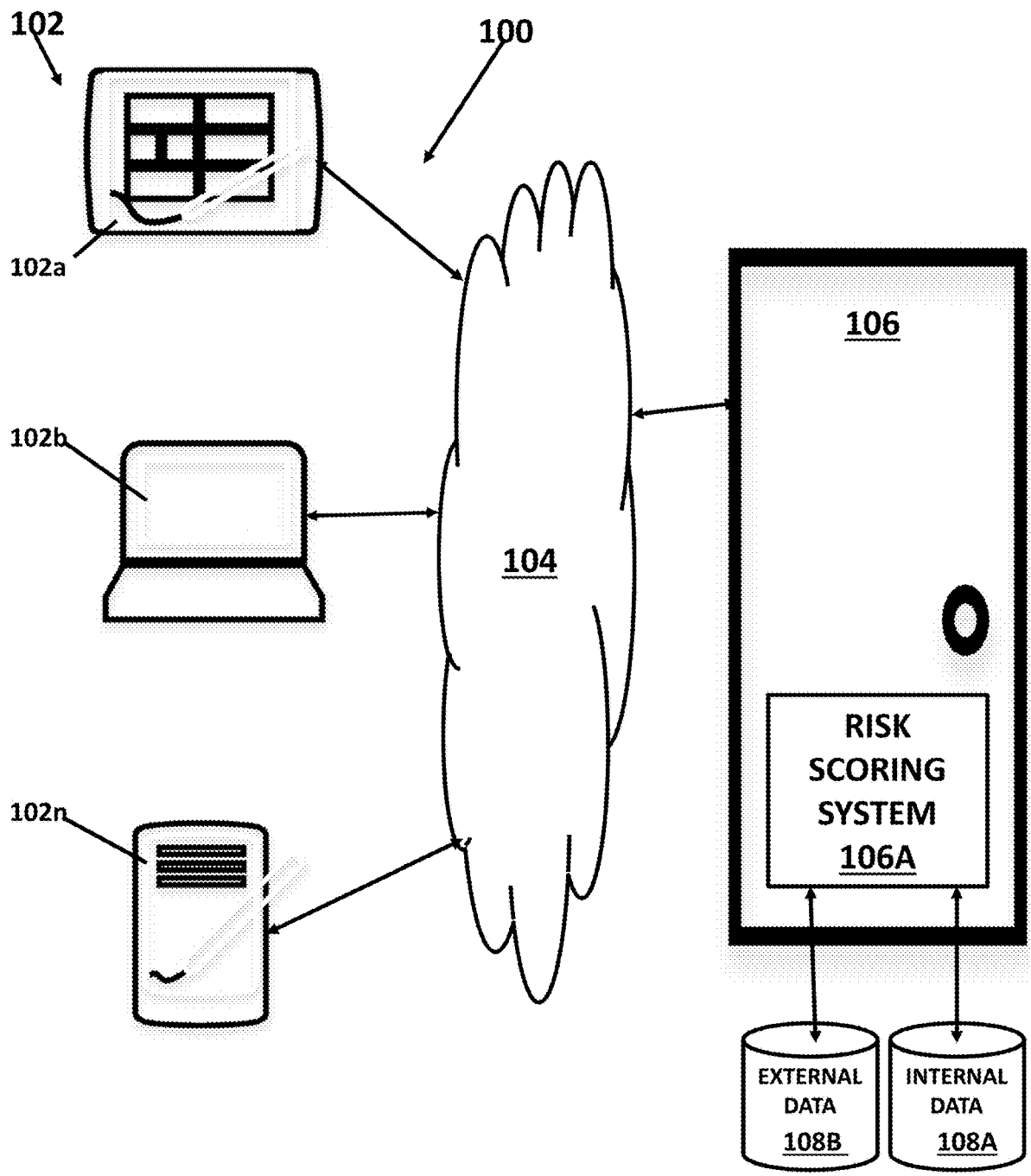
FIG. 1 illustrates an example of an implementation of a workplace risk determining and scoring system.

The disclosure is particularly applicable to a cloud based system that uses various machine learning processes to assess the workplace risk probability and severity for a commercial user and it is in this context that the disclosure will be described. It will be appreciated, however, that the system and method has greater utility, such as to other implementations of the elements shown in the figures and the system may be used for any situation in which it is desirable to be able to determine workplace risk probability and severity. The disclosed system and method merges public and private data points to predict and mitigate risk exposure in real-time through a granular risk matrix which can effectively decrease risk frequency.

The system and method for workplace risk frequency/probability and severity addresses the shortcomings of the known systems and methods, and hence, provide a digital method for the collection and processing of workplace, public and private data to predict and score risk incident frequency and severity. Current workplace hazard and incident reporting systems are antiquated and inefficient. Commercial firms are searching for new and unconventional forms of data, specifically dynamic, real-time information to replace outdated, static sources. Shifting to those next-generation data sets to assess and rate risk based on behavior and conditions rather than by historical data.

The system and method for workplace risk frequency/probability and severity may receive one or more pieces of internal data (data about the particular user that wants the workplace risk frequency/probability and severity assessment) and one or more pieces of external data to perform the assessment. The internal data may include safety compliance, environmental conditions, personnel health conditions, personnel geospatial monitoring, and public safety and risk data points to analyze risk metrics for a machine learning algorithm to output real-time workplace hazard scores for worker notification and safety intervention. The external data points are utilized to cross-check and enhance internal data for efficiency and accuracy to further validate the workplace hazard score to minimize incident frequency and severity.

The data collected is analyzed to create a proprietary scoring model based on machine learning algorithms that categorize commercial users by assessing the likelihood of a future work-place accident. The scoring model relies upon various metrics of data fields based on industry expertise. For example, using raw data fields collected from the workplace, a new variable was created for the standard deviation of the worksite's time to resolve a hazard. This metric is a strong predictor of the likelihood of an incident. The new variable gathers real-time workplace data in order to maintain a proactive risk mitigation culture within the organization, instead of the standard reactive culture. Workplace hazards can be predicted and proactive safety practices implemented prior to a hazard occurring. By integrating active and passive workplace user input the new variable reflects real time hazard probability on a granular scale. Active and passive data points can be combined to reflect dynamic data points that interact and evolve into unique identifiers to grade risk and assess probability of an injury through a Risk Score. This approach is innovative due to its real time capabilities for mitigating risk proactively with dynamic data points. By providing the user a Risk Score, they can quickly and frequently assess workplace risk probability and mitigate hazards before they are escalated into incidents. The ability for the Risk Score to be recursive as dynamic data points are continuously introduced into the model allows for an evolving Risk Score. Thus, the risk score is not based on static data about the entity, but is instead, based on the dynamic data points about the entity as that data becomes available. Data fields are tested in the feature selection process using machine learning techniques. Feature selection relies upon stepwise variable selection process, cross-validation techniques as well as variable of importance tests in order to mitigate over-fitting in the scoring model development.

In one embodiment, the system uses machine learning to generate the scores and probabilities for the workplace hazard. Machine learning uses statistical models that rely on patterns in the data to make predictions. Multiple machine learning algorithms were tested for the scoring model to categorize risks based on the probability of a workplace incident. Final model selection is based on measurements such as Receiver Operating Characteristic (ROC) and Area Under the Curve (AUC) to check the model performance. The system may use various machine learning processes including a generalized Linear Model such as a Regression Approach, Random Forest and/or Gradient Boosting ML models. Now, an implementation of an embodiment of the system will be described.

FIG. 1 illustrates an example of an implementation of a workplace risk determining and scoring system 100 that may be implemented using a client/server type architecture. However, the system 100 may also be implemented using other architectures including a cloud based system, a terminal/mainframe system and the like since the system is not limited to any particular architecture. The system 100 may include one or more computing devices 102 (such as computing devices 102a, . . . , 102n shown in FIG. 1), a communication path 104 and a backend system 106 wherein each computing device 102 connects to and communicates with the backend system 106 over the communication path 104 in order to, for example, provide user interfaces to each computing device, for each computing device to provide internal data to the backend system 106 and for the backend system to provide the scoring of the workplace hazard and severity to each computing device. The system may have one or more stores 108 that store data that is used by the backend system 106 to generate the scoring, such as an internal data store 108A and external data store 108B, each of which may be a hardware based or software based system for storing the data.

Each computing device 102 may be a computer system that has at least one processor, memory, a display and wireless or wired communication circuits that allow it to interact with the backend system 106. For example, each computing device may be a tablet computer 102a, a laptop computer 102b and a smartphone device 102n although each computing device may be other types of computing devices, such as terminals, personal computers and the like. Each computing device 102 may have an application (mobile application, browser application, etc.) that is executed by the processor of the computing device and performs operations including gathering and sending internal data for the particular user using the computing device about its workplace hazards to the backend system 106 and receiving and displaying a user interface/data from the backend system 106 with the scoring for the particular user as described in more detail below.

The communication path 104 may be wired or wireless and may be a combination of wired and wireless networks that provide the communication path between each computing device and the backend system 106. For example, the communication path may be one or more of the Internet, Ethernet, Wi-Fi, cellular digital data network, fiber and the like.

The backend system 106 may be implemented using one or more computing resources, including server computers, blade servers, cloud computing resources and the like and may include a risk scoring system 106A that is connected to the data sources 108A, 108B, receives the various internal and external data and performs the determinations of the workplace hazard risk probability score and the severity determination. In one embodiments, the scoring and determinations performed by the risk scoring system 106A may be performed using one or more machine learning processes wherein each machine learning process is a plurality of lines of instructions/computer code that are executed by a processor of the backend system 106 or each machine learning process may be implemented in a piece of hardware that performs the machine learning process.

Figure 2A:
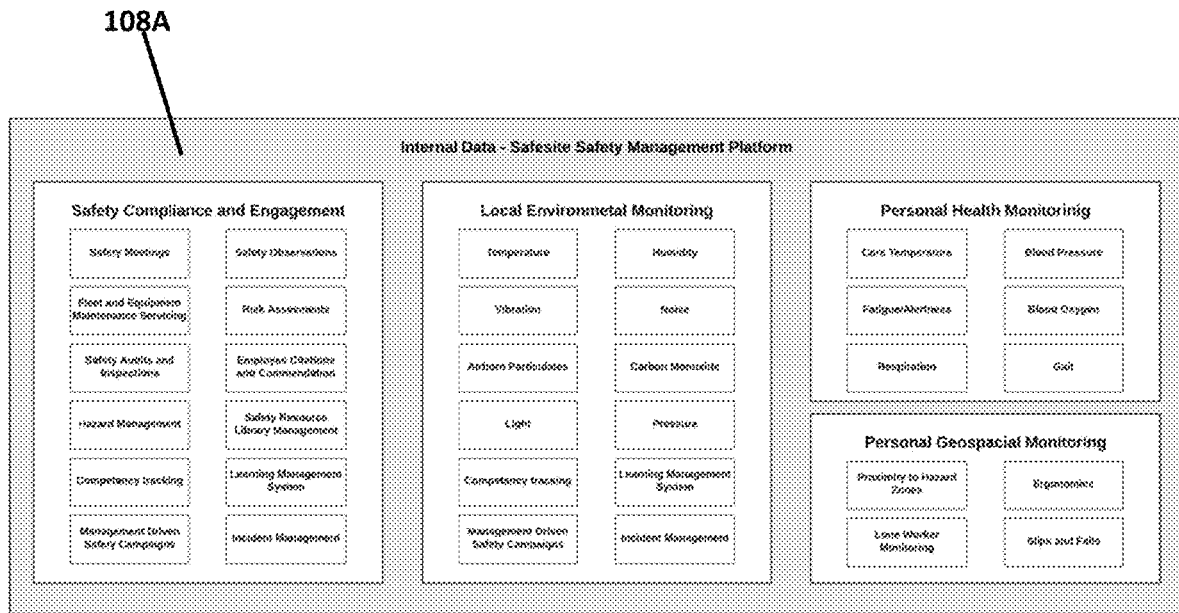
FIG. 2A illustrates an example of the internal data sets that are part of the workplace risk determining and scoring system of FIG. 1.
Figure 2B:
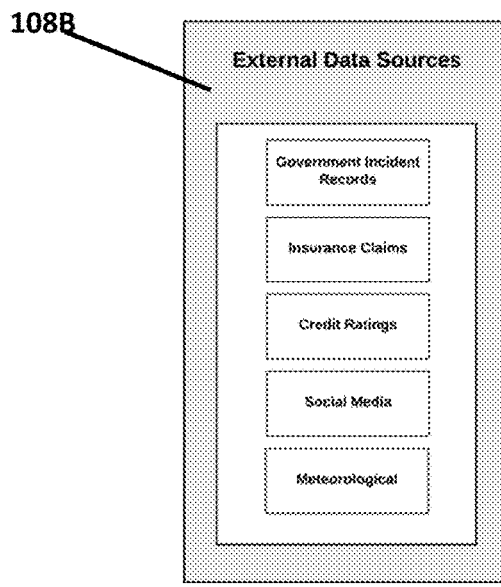
FIG. 2B illustrates an example of the external data sources that are part of the workplace risk determining and scoring system of FIG. 1.

FIG. 2A illustrates an example of the internal data sets 108A that are part of the workplace risk determining and scoring system of FIG. 1 and FIG. 2B illustrates an example of the external data sources 108B that are part of the workplace risk determining and scoring system of FIG. 1. The data in these stores may be gathered from sources or received from each particular user of the system who, in one embodiment, may be a commercial user. As shown in FIG. 2A, the internal data may include safety compliance and engagement data, local environmental monitoring data, personal health monitoring data and person geospatial monitoring data that may be received from or gathered for each user of the system that is going to receive a workplace hazard score. The external data sources may include government incident reports, insurance claims, credit ratings, social media and meteorological data about each user and each user's workplace gathered/retrieved from public and private data sources. The external data sources are not limited to these but a sample of data points that are gathered outside of the workplace data. The internal data in FIG. 2A and the external data in FIG. 2B may be collectively referred to as dynamic data points for an entity. Each of the dynamic data points may be a unique identifier (indicating some piece of information relevant to the workplace hazard) that may be used to grade risk and predict the probability of an injury from a workplace hazard (the Risk Score) as detailed below.

Figure 3:
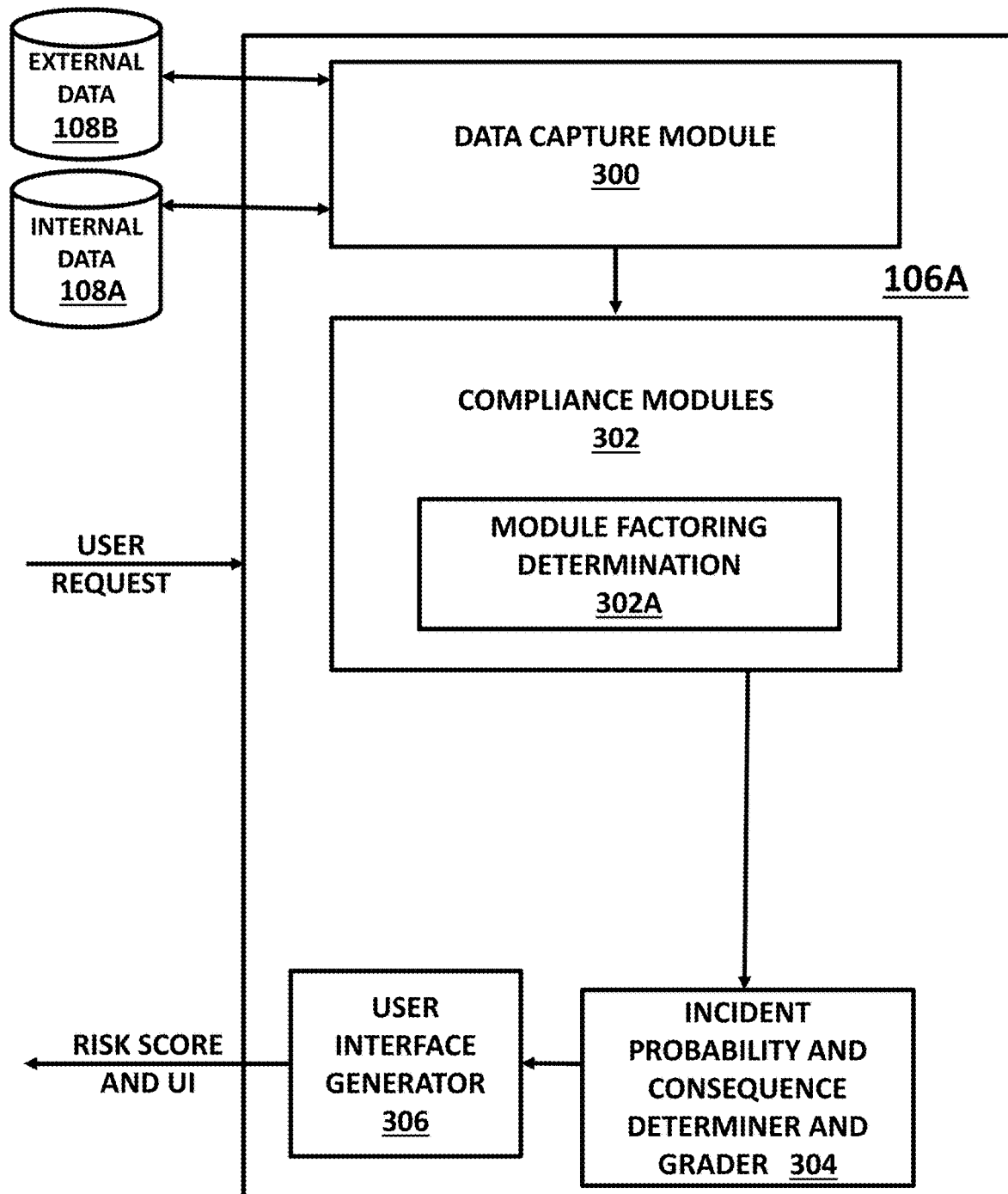
FIG. 3 illustrates more details of the risk scoring element in FIG. 1.

FIG. 3 illustrates more details of the risk scoring element 106A in FIG. 1 that performs the various assessments for workplace hazard risk and generates the workplace risk probability score and the severity assessment for each user based in part of the internal and external data 108A, 108B. In one embodiment, the risk scoring element 106A may be implemented as a plurality of lines of computer code/instructions that are executed by a processor of the backend system 106A to implement the processes and elements shown in FIG. 3. In another embodiment, some or all of the elements shown in FIG. 3 may be implemented in hardware devices that perform the requisite operations. The risk scoring element 106A may include a data capture module 300 that receives, as input, the internal and external data.

The data output by the data capture module 300 is input into one or more compliance modules 302 that each perform an analysis of the internal and/or external data related to the particular compliance module as described below. Each compliance module 302 may include a module factoring determiner 302A that has three internal elements that factor the independent data points. The three elements consist of safety compliance factors, safety behavioral factors, and module significance factor. As each independent data point is factored against the three elements, they are then combined per module to create an average module factor determiner 302A In relation to regulatory compliance requirements per class code classification, the Safety Compliance Factor will assess risk/workplace compliance based on field data collected (How compliant is the company based on data collected?). In relation to best practices and safety standards, the Safety Behavior Factor will benchmark customer behavior against company size and classification (How does the company compare to peers?). In relation to Module Significance Factor, how significant is this module totality in being a leading indicator for incident probability. The outputs of all of the compliance modules may be fed into an incident probability and consequence determiner and grader 304 that generates the scores for the particular user based on that user's particular internal and external data. The results of the incident probability and consequence determiner and grader 304 may be fed into a user interface generator 306 that then send the results to the computing device of each user so that the user can display the results.

In operation, the risk scoring element 106A may receive a user request for an assessment by a commercial user using a computing device. The risk scoring element 106A may retrieve or receive the risk assessment data from the internal and external data sources and may perform the risk scoring processes. The risk scoring element 106A may then generate an incident probability and consequence/severity determination. The incident probability and consequence/severity determination may be returned in a user interface, for example, to the computing device of the user so that the results/scores of the assessment are displayed to the user who can take actions.

Figure 4:
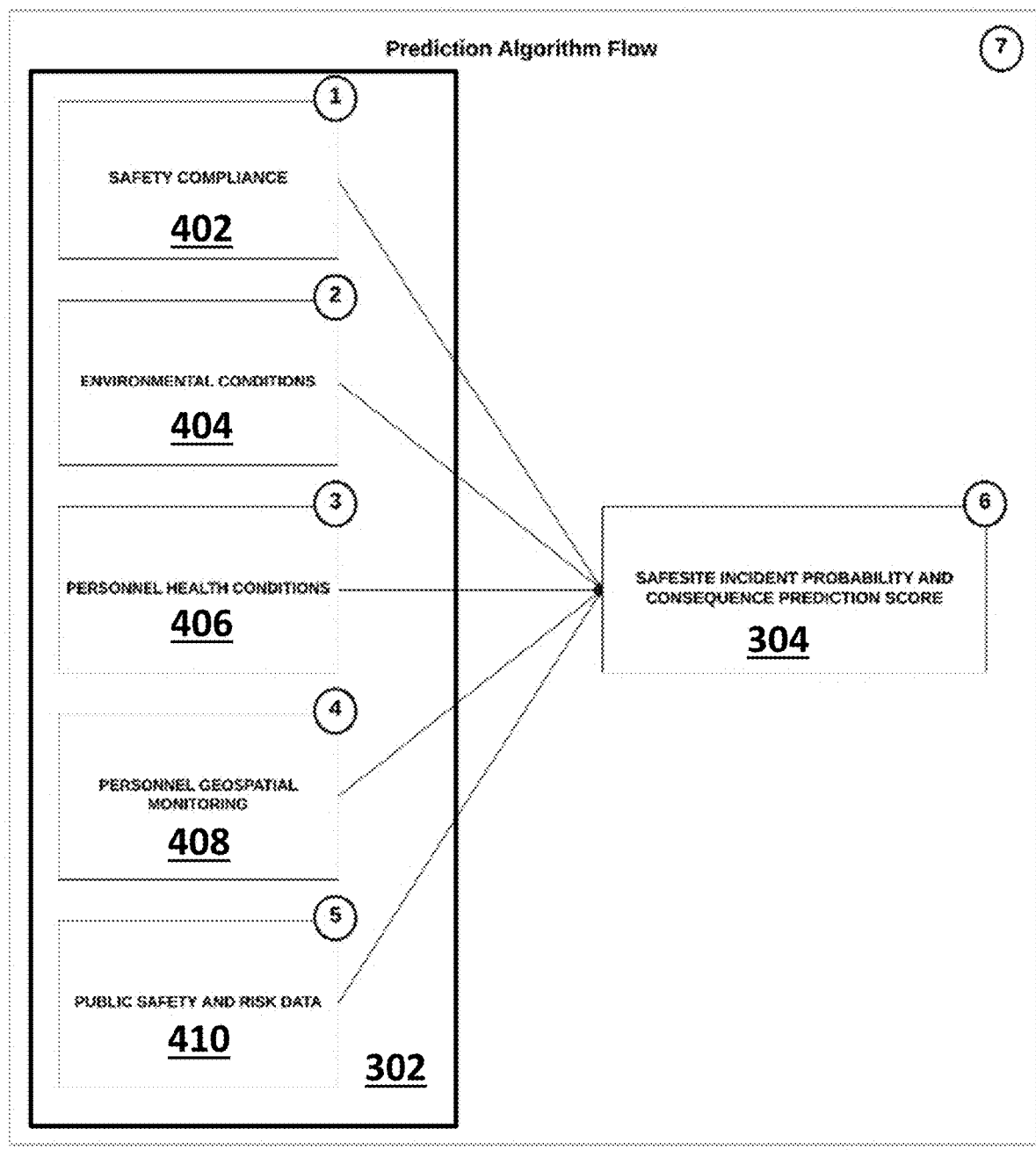
FIG. 4 illustrates more details of the incidence probability and consequence prediction scoring method.

FIG. 4 illustrates more details of the incidence probability and consequence prediction scoring method that may be implemented and performed by the incident probability and consequence determiner and grader 304 in FIG. 3, but may also be performed in other manners that are within the scope of the disclosure. The one or more compliance modules 302 as shown in FIG. 4 may include a safety compliance module 402, an environmental conditions module 404, a personnel health conditions module 406, a personnel geospatial monitoring module 408 and a public safety and risk data module 410. Each of these compliance modules performs and processes a particular type of data related to the workplace hazard and feeds that processed data into the incident probability and consequence prediction score module 304. As described above, the incident probability and consequence prediction score module 304 uses the various pieces of processed data, performs machine learning and artificial intelligence processes to generate a workplace hazard incident probability (in the form of a score in one embodiment) and a consequence of the workplace hazard (severity) prediction (in the form of a score in one embodiment.)

The process shown in FIG. 4 involves an artificial intelligence system for training a classifier within a database of training data and a modeling system for building a classification model based on the training data. The database has a binary classification for each entity and binary tokens indicating whether or not one or more indicators about the entity are true. The classification model is based on a tempered indication of the tokens. The tempered indication is a ratio of a weighted sum of the tokens for each entity divided by a tempering factor for each of the entities. The tempering factor is a function of the unweighted sum of the tokens for each entity. Thus the tempering factor will reduce the tempered indication when large numbers of low weight tokens are present so that the model does not over predict the probability of an entity being in the classification.

The model has external and internal data points that match real-time and predictive data sets to calculate incident frequency and severity. The core data modules consist of at least the compliance modules shown in FIG. 4 and described in more detail below. Each core data module has multiple independent data points that contribute to the modules factoring. These data points are filtered and sorted into the Platform Compliance Modules shown in FIG. 4 based on categorical value. The Platform Compliance Modules 302 consist of independent variables, respective to the module, that are factored to the Safety Module Factoring module in each of the compliance modules 302 (as shown in FIGS. 5-10) that has three elements that factor the independent data points. As shown in FIGS. 5-10, the three elements consist of Safety Compliance Factors, Safety Behavioral Factors, and Module Significance Factor. As each independent data point is factored against the three elements, they are then combined per module to create an average Safety Compliance Module Factor totality. The Safety Compliance Module Factor is multiplied by the Incident Probability and Consequence Prediction process to factor the Safety Score.

The Incident Probability and Consequence Prediction process (FIG. 10) consists of; Factored Safety Modules, Location Incident Probability and Frequency, Location Factor, All Location Scores Combined, Organization Saturation Factor and Organization Incident Probability and Consequence Prediction.

During the process, safety compliance modules 302 (FIG. 6-9) scores are summed to create the Combined Factored Safety Module that provides the Location Incident Probability and Frequency. The relevant risk significance of each location within an organization is then calculated and applied to each location score, Location Factor, that takes into account the relevant workplace conditions and percentage amount of organization workforce within the individual location. All Location Factor scores are summed to get an initial organization Location Scores Combined score. The all Location Scores Combined are multiplied with the Organization Saturation Factor which reflects risk grading through customer engagement levels.

EXAMPLE

To illustrate the process shown in FIG. 4 and FIGS. 6-10 to generate the incident probability and consequence prediction and score, an example is provided. The grading process takes into account a range of different data sources (hence the different compliance modules) in order to accurately grade the risk of each location (project) within an organization as well as the overall risk grading for the entire organization. The resulting risk grade may be, in one embodiment, a single letter (or number, character, etc. . . . ) score that can be consumed by the customer which gives them a real-time understanding of incident probability and consequence for the relevant location.

In the example, the relevant data may be:
Company Name: Builders. Co
Total Company Size: 40
Company Type: Roofing Installer
Location1 Name: North Project
Location 1 Employee Count: 20
Location 2 Name: South Project
Location 2 Employee Count: 5

In the example, in order to calculate the Organizational Incident Probability and Consequence Prediction Score (FIG. 10, process 6.f), the Location Incident Probability and Consequence Score (FIG. 10, process6.b) needs to be calculated for each live location within the organization. To calculate the location scores for "North Project" and "South Project" the process needs to consider all data which is captured and processed in the platform modules (FIGS. 6-9). The steps below show how the relevant internal and external data points are collected and factored for this particulate example to generate the scores.

Safety Compliance Module Using the Example

Figure 5:
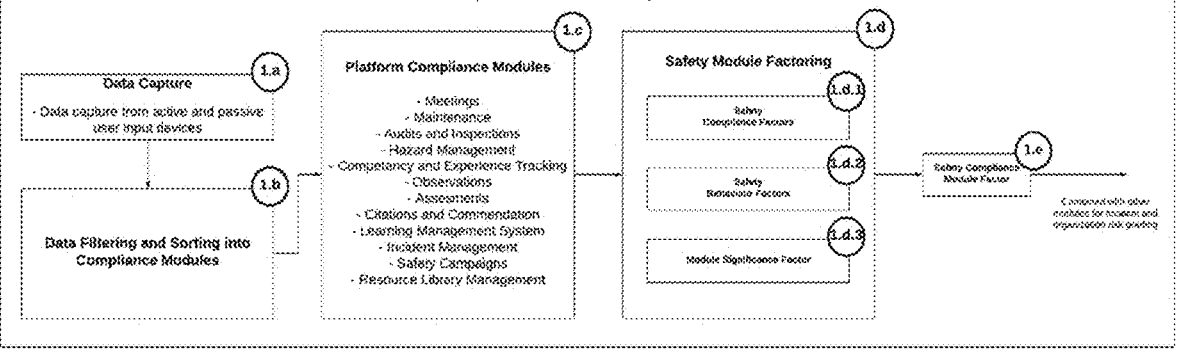
FIG. 5 illustrates more details of the safety compliance module data capture and factoring shown in FIG. 4.

FIG. 5 illustrates more details of the safety compliance module 402 data capture and factoring shown in FIG. 4. The safety compliance module 402 may include a data capture process 1.a that captures safety compliance data from active and passive user input devices. The captured data may be fed into a data filtering and sorting process 1.b that feeds the sorted data into the platform compliance process 1.c wherein the figure shows examples of the different compliance processes and data that may be factored. The data capture and data filtering processes perform continuous and circular data processing so that the risk can be properly assessed and predicted in a real-time basis. The results from the compliance process 1.c may be fed into a Safety Module Factoring process 1.d that generates safety compliance factors 1.d.1, safety behavior factors 1.d.2 and a module significance factor 1.d.3 and those factors may be fed into a safety compliance module factor process 1.e that is output to the incident probability and consequence prediction score module 304.

In the example and more generally, the safety compliance module 402 is primarily concerned with the safety compliance activities that are performed by the employees on the project that is then factored. In the example, the work being completed by Builders. Co is predominantly on the roof that exposes workers to "Falls from Heights" and "Object Falling from Height" hazards. It is known through historical insurance and OSHA records (public data input into this compliance module) that this work has a high frequency of incidents with a high level of severity due to the heights involved. This work type triggers the expected compliance activity type and frequency within the Safesite platform. For example, in this example, the safety compliance module would expect all workers to have up to date working at heights training, regular fall arrest harness inspections and regular toolbox talk meetings relating to working at heights safety. The method also would expect all workers at these locations to be engaged in safety compliance activities and contribute to the safety culture through actions in a Safesite app that may be used with the system as shown in FIG. 1.

For the example, the safety compliance characteristics of each location may be:
"North Project"
  No equipment registered for maintenance
  Only 5 of 20 employees have certifications registered
  Low overall engagement (5 out of 20 employees completing regular safety items)
  No meetings have been conducted relating to working at heights
  No record of near miss or incidents
"South Project"
  200 equipment items registered in the platform for maintenance
  All 5 employees have certifications registered
  High engagement all 5 employees completing regular safety items
  Regular meetings have been conducted relating to many topics including working at heights
  Multiple near miss and first aid injury incident reports Based on the above characteristics, the Safety Compliance Module (FIG. 5) sorts the relevant data entered into the mobile and desktop portal (from the one or more computing devices in FIG. 1) for these compliance activities into the relevant Platform Compliance Modules (FIG. 5, process 1.c). The performance within each Platform Compliance Module is then factored for Safety Compliance (FIG. 5, process 1.d.1), Safety Behaviors (FIG. 5, process 1.d.2), and The Module Significance (FIG. 5, process 1.d.3). In this example, for "North Project" the Platform Compliance Modules will all have low scores for Safety Compliance, Low Scores for Safety Behaviors given the characteristics above and, for the "South Project", the Platform Compliance Modules will all have high scores for Safety Compliance, high Scores for Safety Behaviors. Furthermore, the Module Significance Factor for both locations will be high for critical safety tasks like Meetings and Maintenance but lower for other modules like Resource Library Management. Now that the internal data has been collected, processed and factored, the entire Safety Compliance Module (FIG. 5) is factored by the Safety Compliance Module Factor (FIG. 5, process 1.e). This factor contextualizes the module in relation to the other modules within the overall process. In this example, it is rated highly since these are fundamental tasks that all companies should complete and the leading indicators have a strong correlation with incident frequency and severity. For example, it is highly rated because the quantitative analysis is highly desirable and shows the variables that have the highest influence on the risk and are essential in validating the risk model.

Environmental Conditions Module Using the Example

Figure 6:
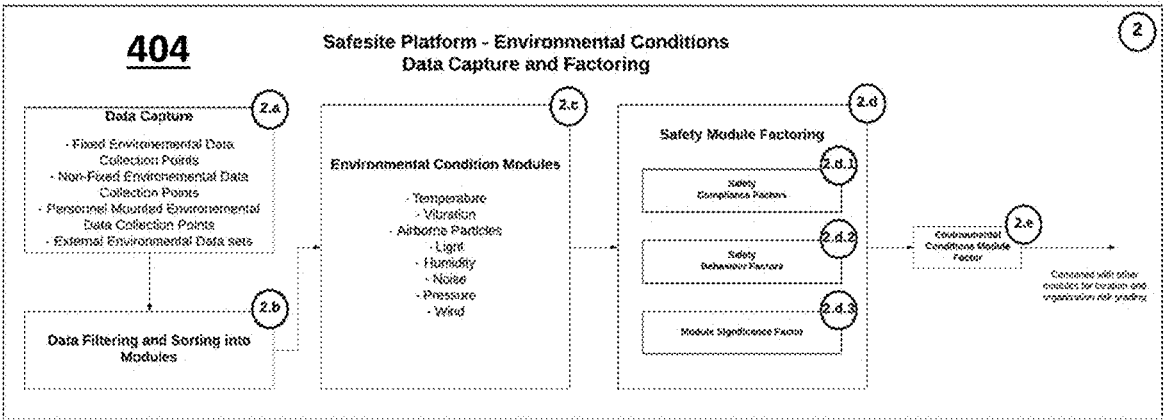
FIG. 6 illustrates more details of the environmental conditions data capture and factoring shown in FIG. 4.

FIG. 6 illustrates more details of the environmental conditions 404 data capture and factoring shown in FIG. 4. The environmental conditions compliance module 404 may include a data capture process 2.a that captures the environmental data, such as the different types of environmental data shown in FIG. 6. The captured data may be fed into a data filtering and sorting process 2.b that feeds the sorted data into the platform compliance process 2.c wherein the figure shows examples of the different compliance processes (temperature, vibration, airborne particles, etc.) and data that may be factored. The results from the compliance processes 2.c may be fed into a safety factoring process 2.d that generates safety compliance factors 2.d.1, safety behavior factors 2.d.2 and a module significance factor 2.d.3 and those factors may be fed into a safety compliance module factor process 2.e that is output to the incident probability and consequence prediction score module 304.

In the example and more generally, this module 404 contextualizes environmental conditions from fixed and personnel mounted locations and weights their impact on the location incident frequency and severity score. In the example, since working at heights is a high exposure, the employees from Builders. Co will likely face hazardous environmental conditions that should be constantly monitored and the Environmental Characteristics of each Location may be:

"North Project"
  High Temperature
  Low Wind
"South Project"
  Average Temperature
  Low Wind
  Vibration sensor reporting vibrations above acceptable levels at ground level For "North Project" an alert will be sent for high temperatures to the project administrator and field workers via the mobile app that executes on a computing device used by those individuals. The alert will recommend safety actions to be completed as a result of this exposure. If these recommended actions are completed then the Safety Compliance Factor (FIG. 6 process 2.$d$.1) and Safety Behaviour Factor (FIG. 6 process 2.$d$.2) will both increase. Since a lot of injuries when working on roofs occur due to heat exhaustion, the Module Significance Factor (FIG. 2.$d$.3) will be high.

For "North Project" a "High Vibration" alert will be sent to the project administrator via the mobile app. On-site, it is determined that this vibration is not impacting the workers on the roof. A suitable response is provided within the mobile app. This will result in a positive Safety Compliance Factor (FIG. 6, process 2.$d$.1) and Safety Behavior Factor (FIG. 6, process 2.$d$.2). The Module significance factor will be low since vibration is less likely to cause issues for roof workers. In this example, since environmental conditions have a large impact on roofing workers due to their high exposure, the Environmental Conditions Module Factor (FIG. 6, process 2.$e$) will be rated higher than other modules.

Figure 7:
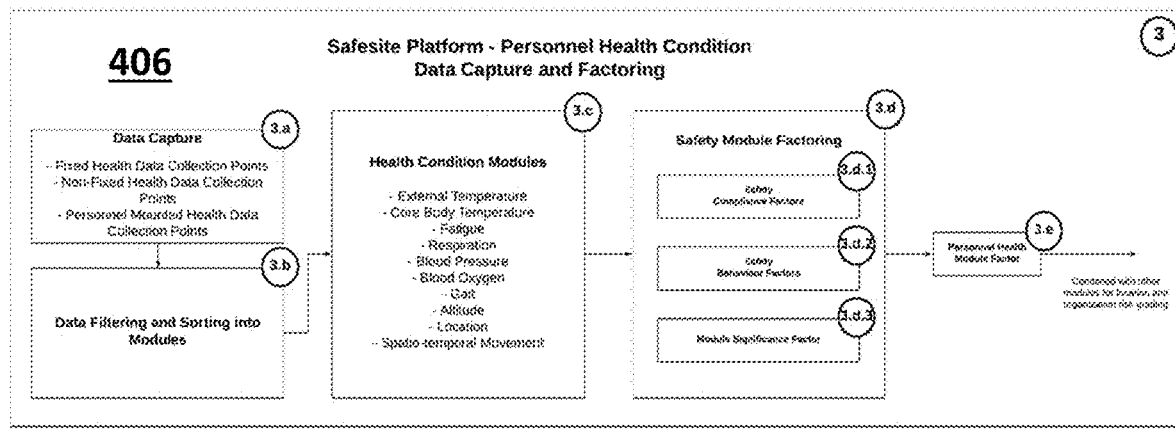
FIG. 7 illustrates more details of the personnel health condition data capture and factoring shown in FIG. 4.

Personnel Health Condition, Personnel Geospatial Monitoring and Public Safety and Risk Data Modules Using the Example FIG. 7 illustrates more details of the personnel health condition data capture and factoring shown in FIG. 4. The personnel health condition compliance module 406 may include a data capture process 3.$a$ that captures the health data, such as the different types of health data shown in FIG. 7. The captured data may be fed into a data filtering and sorting process 3.$b$ that feeds the sorted data into the platform compliance process 3.$c$ wherein the figure shows examples of the different health compliance processes (external temperature, core body temperature, blood oxygen, etc.) and data that may be factored. The results from the compliance processes 3.$c$ may be fed into a safety factoring process 3.$d$ that generates safety compliance factors 3.$d$.1, safety behavior factors 3.$d$.2 and a module significance factor 3.$d$.3 and those factors may be fed into a safety compliance module factor process 3.$e$ that is output to the incident probability and consequence prediction score module 304.

Figure 8:
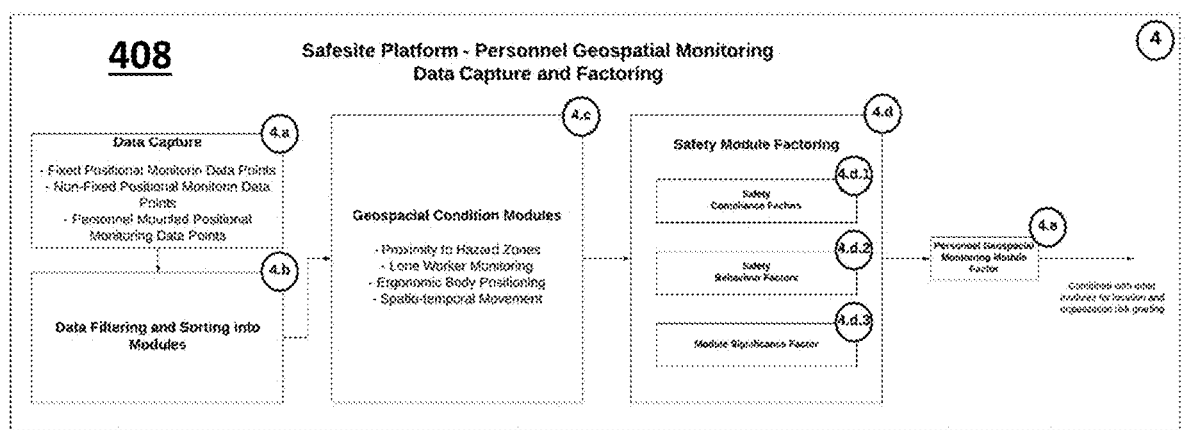
FIG. 8 illustrates more details of the personnel geospatial monitoring data capture and factoring shown in FIG. 4.

FIG. 8 illustrates more details of the personnel geospatial monitoring data capture and factoring shown in FIG. 4. The personnel geospatial monitoring compliance module 408 may include a data capture process 4.$a$ that captures the personnel geospatial data, such as the different types of personnel geospatial data shown in FIG. 8. The captured data may be fed into a data filtering and sorting process 4.$b$ that feeds the sorted data into the platform compliance process 4.$c$ wherein the figure shows examples of the different compliance processes (proximity to hazard zone, etc.) and data that may be factored. The results from the compliance processes 4.$c$ may be fed into a safety factoring process 4.$d$ that generates safety compliance factors 4.$d$.1, safety behavior factors 4.$d$.2 and a module significance factor 4.$d$.3 and those factors may be fed into a safety compliance module factor process 4.$e$ that is output to the incident probability and consequence prediction score module 304.

Figures 9, 10:
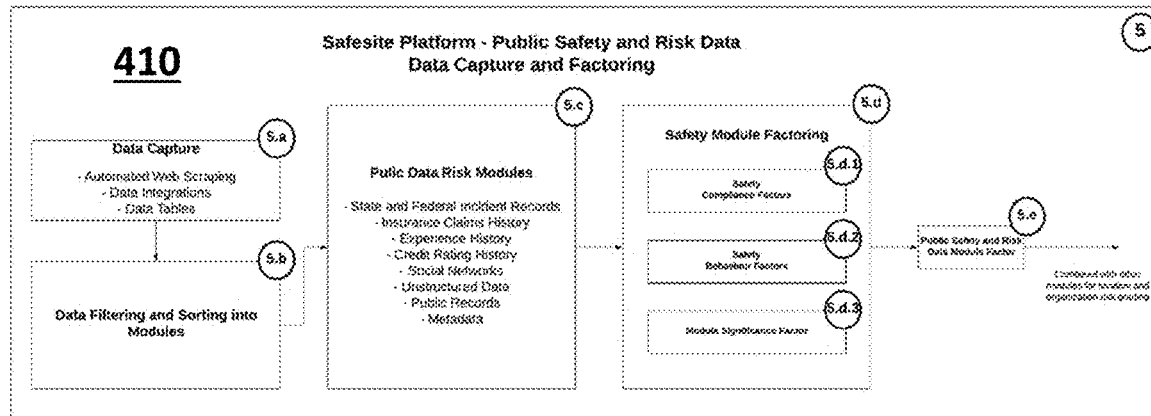
FIG. 9 illustrates more details of the public safety and risk data capture and factoring shown in FIG. 4.
FIG. 10 illustrates more details of the incidence probability and consequence prediction process weighting factor feedback loop shown in FIG. 4.

FIG. 9 illustrates more details of the public safety and risk data capture and factoring shown in FIG. 4. The public safety and risk data compliance module 410 may include a data capture process 5.$a$ that captures the environmental data, such as the different types of environmental data shown in FIG. 9. The captured data may be fed into a data filtering and sorting process 5.$b$ that feeds the sorted data into the platform compliance process 5.$c$ wherein the figure shows examples of the different compliance processes (state and federal incident records, experience history, etc.) and data that may be factored. The results from the compliance processes 5.$c$ may be fed into a safety factoring process 5.$d$ that generates safety compliance factors 5.$d$.1, safety behavior factors 5.$d$.2 and a module significance factor 5.$d$.3 and those factors may be fed into a safety compliance module factor process 5.$e$ that is output to the incident probability and consequence prediction score module 304.

In the example, as above, similar data capture and assessment for immediate risk, compliance and behavior is conducted. The modules are then factored for their significance in the context of the work being completed and the location characteristics Incidence Probability and Consequence Prediction Process Using the Example FIG. 10 illustrates more details of the incidence probability and consequence prediction process 304 weighting factor feedback loop shown in FIG. 4. The incidence probability and consequence prediction process may perform a live weighting factor process 8.$a$ using the internal module factors shown in FIG. 5-9, a platform external module factor from each of the compliance modules, a location weighting factor 6.$c$ and an organizational saturation factor 6.$e$. The Location Weighing Factor is equal to a number of staff/employees/contractors per jobsite and the Organization Saturation Factor measure the total staff tech usage and compliance. The weighting factors may be fed into a predicted location incident probability and frequency process 6.$b$ and a predicted organization incident probability and frequency process 6.$f$ that are performed using the classification processes and machine learning. The predicted location incident probability and frequency process 6.$b$ may be compared to an actual location incident frequency and the predicted organization incident probability and frequency process 6.$f$ may be compared to an actual organization incident frequency. The results of the comparisons are new calculated weighting factors that are fed back to the live weighting factor process 8.$a$.

The system may use various different known or unknown machine learning algorithms that can be used to categorize risks based on the probability of a workplace incident and each algorithm's effectiveness may be determined based on measurements such as Receiver Operating Characteristic (ROC) and Area Under the Curve (AUC) to check the model performance. Thus, the system may use various machine learning processes simultaneously for comparison including but not limited to a generalized Linear Model such as a Regression Approach, Random Forest and/or Gradient Boosting ML models. The ML models may further include but are not limited to, Principal Component Analysis (PCA), Constrained Linear Regression (CLR) and Feed-Forward Neural Network (FFNN). The same machine learning algorithm(s) may be used throughout the risk scoring (see section [0020]).

In the system, there may be a module score that is a single score per safety module that weights and summarizes the available data points in order to provide a proxy for engagement, compliance and best practices. There is also a project score that is a single score per project that weights and combines project module scores in order to provide a proxy for engagement, compliance and best practice. There may also be an org Score that is a single score per organization that weights and combines project scores and org user saturation in order to provide a proxy for engagement, compliance and best practices. The system and method may also determine a Max Organization Score=weighted average of Organization Saturation Factor.

In the example, the scores from each module are added to produce the location Incident Probability and Consequence Score (FIG. 10, process 6.b) that is a score out of 100 with 100 being a strong safety score representing a low likelihood of injuries occurring at the location and 0 being an extremely high risk location with very poor safety risk characteristics. For "North Project" the safety compliance score was very low, however, there was a rapid response to the environmental alerts. location Incident Probability and Consequence Score (FIG. 6.b) for this location was calculated to be 40. The platform displays this to safety administrators for Builders. Co as a single letter score from A to D. A score of 40 would be represented as a C—. For "South Project" the safety compliance score was very high, including the rapid response to environmental alerts. location Incident Probability and Consequence Score (FIG. 10, process 6.b) for this location was calculated to be 80, with the Risk Score grade being A—.

Location Factor

Each location is factored by the Location Factor (FIG. 10, process 6.c). This factor is designed to weight the impact of the location on overall company score based on the number of employees present at the location. For "North Project", the 20 workers represent 50% of the company. The score of 40 will be multiplied by 0.5 and added to the other location scores. For "South Project", the 4 workers represent 12.5% of the company so the score of 80 will be multiplied by 0.125 and added to the other location scores.

All Location Scores Combined

The 2 location scores for Builders. Co are then added to produce the "All Locations Score Combined (FIG. 10, process 6.d). In the example, the North Project Score: 20 and the South Project Score: 10 with a Total Score=30. As seen, even though South Project has performed well, since there was a relatively low amount of workers at that location, the positive bearing on overall organization score is limited.

Organization Saturation Factor

The Organizational Saturation Factor (FIG. 10, process 6.e) is used to limit the total organization score based on the number of employees engaged in the platform and therefore the company safety program. It is used to incentivize top-down promotion of engagement in the safety program of all employees from a corporate level. Every single person can help contribute to the total score. To achieve a max score, greater than 70% of the company needs to be engaged in the application. For Builders. Co, 10 out of 40 employees (25%) are engaged in the app. This will Factor therefore reduce the current score of 30 by multiply with 33% (This is 25%/75%) Resulting in a final organizational risk score of 10.

Organizational Incident Probability and Consequence Prediction

The final Organizational Incident Probability and Consequence Prediction score (FIG. 10, process 6.f) for Builders. Co is 10 out of 100. This is a very low score and would be represented to the customer as a D—. This is a high-risk customer from an organizational perspective and a significant increase in engagement in the corporate safety program and Safesite app would be required.

The quickest way to increase this score would be to add additional users to the platform for all locations and ensure that each user engages in safety compliance and behavioral activities as well as responding to alerts from the platform generated by elevations in risk that have been detected. A good place to start would be ensuring all 20 "North Project" users are engaged in the platform. This would improve the score as shown below:

New "North Project" Characteristics:
All 20 employees highly engaged in the platform
New Location Probability and Frequency Score (FIG. 6.b): 80
New All Locations Scores Combined: 50 (80*.5+80*.125)
New Organization Saturation %: 62.5% (25/40)
New Organization Saturation Factor: 83% (62.5%/75%)
New Final Organizational Incident Probability and Consequence Prediction Score: 41 (50×83%)
New Grade: C—

Incidence Probability and Consequence Prediction Process Using a Second Example

In a second example of the system and method are described for a manufacturing company that produces textile products, has 50 employees, has two locations including Building A in which 20 employees work and Building B in which 30 employees work and the manufacturing company manufactures textile products in these two large buildings. The locations are the only locations for the company and constitute the scope of the system platform deployment and the evaluation for the risk grading method and the resulting incident probability and consequence score. Based on OSHA historical records, the predominant injury types experienced in these types of manufacturing locations are: 1) back and shoulder injuries due to poor working ergonomics and repetitive stress loading; and 2) Pinching and Crushing of body parts, predominantly fingers and hands, in machinery that is poorly guarded or poorly maintained.

Safety Compliance Module

The work type and associated risks will trigger expected safety compliance activities and safety engagement behaviors within the system platform. These are based on minimum industry compliance standards and best practice standards established by manufacturing industry associations.

For this organization, the minimum compliance expectations include: 1) All employees have completed safety training related to the work tasks they are performing; 2) All hazards within the workplace are documented and communicated with resolution tracked; 3) Regular inspections are carried out in the workplace to ensure equipment is in safe conditions and the organization safety standards are being adhered to; and 4) All incidents (including near miss) are documented with root cause and lessons learned communicated. The examples of best practice behaviors for this organization include: 1) All staff attend regular safety meetings where hazards, incidents and safety initiatives are communicated; 2) All staff complete a "stretch and flex" multiple times per day which is recorded as a positive safety behavior; 3) All staff regularly record and communicate positive and negative safety observations; and 4) Staff complete regular ergonomic and machine guarding risk assessments on each other and communicate lessons learned and opportunities for safety improvement.

For this example, the compliance and safety behavior characteristics of Manufacturing Co are:

| Compliance or Behavior activity | Expected Engagement | Building A Engagement | Building B Engagement | Significance |
|---|---|---|---|---|
| Safety training completed | 100% Trained | 100% | 80% | Very High |
| Hazards Managed | 10 Per week Per Employee | 10 | 8 | High |
| inspections Completed | 5 Per Week Per Employee | 5 | 5 | High |
| Incident Reports | 2 Per Week Per Employee | 1 | 0 | High |
| Attend Safety Meetings | 1 Per Week Per Employee | 1 | 1 | Medium |
| Stretch and Flex | 5 Per Week Per Employee | 5 | 1 | Medium |
| Safety Observations | 5 Per Week Per Employee | 5 | 0 | Medium |
| Risk Assessments | 2 Per Week Per Employee | 2 | 1 | Medium |
| Employees Engaged | 100% | 15 Employees | 28 Employees | High |

Based on the above characteristics, the Safety Compliance Module (FIGS. 3-4) sorts the relevant data entered into the mobile and desktop portal for these compliance and behavioral activities into the relevant Platform Compliance Modules (FIG. 4). The performance within each Platform Compliance Module is then factored for Safety Compliance, Safety Behavior, and The Module Significance (FIGS. 5-9).

For "Building A" the safety compliance and behavior expectations set are almost entirely met resulting in a Platform Compliance Module score of 90/100. For "Building B" the safety compliance scores are high, however the behavior expectations are not met resulting in a Platform Compliance Module score of 70/100. Safety compliance activities are a significant indicator of the health of a safety culture, this module is factored highly compared to other modules. Module factor will be 0.9.

Environmental Conditions

This module contextualizes environmental conditions from fixed and personnel mounted locations and weights the impact on the location incident frequency and severity score. Based on the work being completed by Manufacturing Co, the most significant environmental risk factors are ambient temperature, Vibration and Noise. The environmental Characteristics of each Location may be:

"Building A"
  Temperature: High (outside of Acceptable Range for extended period)
  Vibration: Low
  Noise: Low "Building B"
  Temperature: Within acceptable range
  Vibration: Low
  Noise: Low For "Building A" an alert will be sent for high temperatures to the project administrator and field workers via the mobile app that is part of the system in FIG. 1. The alert will recommend safety actions to be completed as a result of this exposure eg, stop work at regular intervals or completely if heat fatigue signs are showing. If these recommended actions are completed then the Safety Compliance Factor (element 2.d.1 in FIG. 6) and Safety Behavior Factor (element 2.d.2 in FIG. 6) will both increase for Building A. Since a lot of injuries occur due to heat exhaustion, the Module Significance Factor (element 2.d.3 in FIG. 6) will be high. Score will be 65/100 for Building A environmental conditions.

For "Building B" All environmentals are within acceptable ranges. Those facts result in a positive Safety Compliance Factor (element 2.d.1 in FIG. 6) and Safety Behavior Factor (element 2.d.2 in FIG. 6) for Building B. The Module significance factors for temperature and noise will be high with the vibration being low. The score will be 90/100 for Building B environmental conditions. Since environmental conditions for factory workers are less significant than other safety modules, the environmental condition factor (element 2.e in FIG. 6) will be rated as average compared with other modules and the module factor will be 0.5 for both buildings.

Personnel Health Conditions

Manufacturing Co has not deployed devices to track and does not record any personnel health data that is recorded in the platform in FIG. 1. In this example, this module is therefore given a score of 50/100. Since Personnel Health Data is a significant leading indicator of safety incidents, the module significance score will be 0.75.

Personnel Geospatial Monitoring

Manufacturing Co, is conducting a trial in Building A on the use of an IoT wearable that is worn on the arms and back of the worker. This wearable produces a risk profile regarding the ergonomic stresses experienced by the wearer in their back and shoulders. When excess stress is experienced by the wearer, an alert is sent to the shift supervisor and the worker. The notification will recommend rest and a reassessment of the work environment. Training may be recommended if the issue persists or is widespread amongst the workforce.

For the workers in Building A, the IoT device is reporting no excess strain in any of the workers, representing a strong commitment to lifting and moving correctly. This will result in a high compliance and behavior score for ergonomic positioning. A Personnel Geospatial score of 90/100 is recorded for building A. Since Building B has not implemented the devices, a score of 50/100 is recorded.

Although ergonomic stresses are a major cause of injury within manufacturing locations, they are typically not acute but they are debilitating in the long term. This module is factored at 0.7 in relation to other modules.

Public Safety and Risk Data (FIG. 9)

The following public information is available for Manufacturing Co and is considered in the Public Safety and Risk Data module.

Credit Rating:
  High
  No follow up actions required
  Insurance Claims History:
  Frequency in line with industry average
  Historically, 50% of claims made from injuries that occur on a Monday. Alert raised for pattern of fraud
  Actions created in platform for managers to regularly ensure workers are not injured before starting work on a Monday morning
  Incidents recorded in the platform are not disproportionately weighted to a Monday Based on the public data collected for Manufacturing Co, a score of 80/100 is achieved for the Public Safety and Risk Data module. This module has a relatively low factor in relation to other modules. Module significance factor: 0.3

Location Probability and Frequency Score (element 6.b in FIG. 10)

Building A Location Score Calculation

| Module | Score | Module Significance Factor | Resulting Score |
|---|---|---|---|
| Safety Compliance | 90/100 | 0.9 | 81 |
| Environmental Conditions | 65/100 | 0.5 | 32.5 |
| Personnel Health condition | 50/100 | 0.75 | 37.5 |
| Personnel Geospatial Monitoring | 90/100 | 0.7 | 63 |
| Public Safety and risk Data | 80/100 | 0.3 | 24 |
| Factored Total | | 315 | 238 |

Resulting Weighted Score: 238/315=0.755
Resulting Risk Score: A
Building B Location Score Calculation:

| Module | Score | Module Significance Factor | Resulting Score |
|---|---|---|---|
| Safety Compliance | 70/100 | 0.9 | 81 |
| Environmental Conditions | 90/100 | 0.5 | 32.5 |
| Personnel Health condition | 50/100 | 0.75 | 37.5 |
| Personnel Geospatial Monitoring | 50/100 | 0.7 | 63 |
| Public Safety and risk Data | 80/100 | 0.3 | 24 |
| Total | | 315 | 238 |

Resulting Weighted Score: 204.5/315=0.649
Resulting Risk Score: B
Location Factor (element 6.c in FIG. 10)

Location factor is directly related to the employees in each location in relation to the overall company employee count. Thus, Building A Factor: 20/50=0.4 and Building B Factor: 30/50=0.6.

Location Scores Combined (element 6.d in FIG. 10)

The location scores are now weighted by the Location Factor (6.C) and combined and the combined weighted location scores=(0.755×0.4)+(0.649×0.6)=0.692.

Organizational Saturation Factor (element 6.e in FIG. 10)

The organization saturation factor is directly related to the total organization employees engaged in the platform. For Manufacturing Org the saturation factor is: Total engaged users/Total employees=(15+28)/50=0.86.

Organization Probability and Consequence Prediction (element 6.f in FIG. 10)

The Location Scores Combined (6.d) is then multiplied by the Organization Saturation Factor (6.e) to produce the Organization Probability and Consequence score. For Manufacturing Org, this is: 0.86×0.692=0.595. This equates to a Risk Score of B.

These two examples give an example of the system and method in two different industry contexts and shows how the scores, etc. generated by the system and method are both company specific and industry specific.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media.

Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
continuously capturing one or more pieces of internal data for an entity about a workplace hazard including safety compliance data, environmental conditions data, personnel health data and personnel geospatial monitoring data and one or more pieces of external data about the workplace hazard for the entity including public safety and risk data that form a plurality of dynamic data points for the workplace hazard risk of the entity wherein each of the plurality of dynamic data points is a data point to grade risk and predict probability of an injury from the workplace hazard for the entity;
continuously introducing the continuously captured dynamic data points into a plurality of compliance modules including a safety compliance module, an environmental conditions module, a personnel health module, a personnel geospatial monitoring module and a public safety and risk module;
processing the continuously captured dynamic data points by each of the plurality of compliance modules that generate a safety compliance factor that assesses a compliance of the entity for workplace risk based on the continuously captured dynamic data points, a safety behavior factor that assesses a set of behaviors of the entity for workplace risk against a similar sized company and a module significance factor that assesses a significance of the particular compliance module relative to a workplace hazard incident probability and wherein each compliance module generates a safety factor;

performing, using a recursive machine learning process executed by a processor of a computer system, a scoring process for a workplace risk probability indicator for the entity and a workplace risk severity indicator for the entity, based on the safety factors for each of the compliance modules for the entity and weighing all of the safety factors for all of the compliance modules to generate an evolving risk score of the probability and severity of the workplace hazard for the entity that evolves when more continuously captured dynamic data points are introduced; and generating, by the processor of the computer system, a user interface that displays the evolving risk score to an authorized user of the entity, wherein the evolving risk score determines the workplace hazard incident probability and severity for the entity based on the continuously introduced dynamic data points.

2. The method of claim 1, wherein performing the scoring process further comprises receiving, at an incidence probability and consequence prediction module, each of the factors from each of the compliance modules, weighing each of the factors with a location weighting factor and an organizational saturation factor, wherein the location weighting factor is equal to a number of humans at each jobsite of the entity as a proportion of the total humans employed by the entity and the organizational saturation factor measures a use of technology by the humans in the entity for workplace hazard compliance.

3. The method of claim 2, wherein generating the risk score further comprises generating a letter grade indicative of the probability and severity of the workplace hazard for the entity.

4. The method of claim 1, wherein the performing the score process using the recursive machine learning further comprises feeding back the weighted safety factors into the recursive machine learning process and reweighting the safety factors from each compliance module based on the fed back weighted safety factors.

5. The method of claim 1, wherein the incidence probability and consequence module further configures the processor to feed back the weighted safety factors into the recursive machine learning process and reweight the safety factors from each compliance module based on the fed back weighted safety factors.

6. A system, comprising:
a backend that has at least one computer system having a processor that determines a workplace hazard incident probability and severity for an entity;
the backend having a data capture module that continuously captures one or more pieces of internal data for an entity about a workplace hazard including safety compliance data, environmental conditions data, personnel health data and personnel geospatial monitoring data and one or more pieces of external data about the workplace hazard for the entity including public safety and risk data that form a plurality of dynamic data points for the workplace hazard risk of the entity wherein each of the plurality of dynamic data points is a data point to grade risk and predict probability of an injury from the workplace hazard for the entity;
the backend having a plurality of compliance modules wherein each compliance module further comprises a plurality of instructions executed by the processor of the backend and the processor is configured to continuously introduce the continuously captured dynamic data points into the plurality of compliance modules including a safety compliance module, an environmental conditions module, a personnel health module, a personnel geospatial monitoring module and a public safety and risk module;
wherein each compliance module further configures the processor to process the continuously captured dynamic data points to generate a safety compliance factor that assesses a compliance of the entity for workplace risk based on the continuously captured dynamic data points, a safety behavior factor that assesses a set of behaviors of the entity for workplace risk against a similar sized company and a module significance factor that assesses a significance of the particular compliance module relative to a workplace hazard incident probability and wherein each compliance module generates a safety factor;
the backend further comprising an incidence probability and consequence module that has a plurality of instructions executed by the processor of the backend and the processor is configured to perform a recursive machine learning process that generates a for a workplace risk probability indicator for the entity and a workplace risk severity indicator for the entity based on the safety factors for each of the compliance modules for the entity and weighing all of the safety factors for all of the compliance modules to generate the evolving risk score of the probability and severity of the workplace hazard for the entity using the recursive machine learning process; and
the backend further comprises a user interface generator that has a plurality of instructions executed by the processor of the backend and the processor is configured to generate a user interface that displays the evolving risk score to an authorized user of the entity, wherein the evolving risk score determines the workplace hazard incident probability and severity for the entity based on the continuously introduced dynamic data points.

7. The system of claim 6, wherein the incidence probability and consequence prediction module is further configured to receive each of the module factors from each of the compliance modules, weigh each of the module factors with a location weighting factor and an organizational saturation factor, wherein the location weighting factor is equal to a number of humans at each jobsite of the entity as a proportion of the total humans employed by the entity and the organizational saturation factor measures a use of technology by the humans in the entity for workplace hazard compliance.

8. The system of claim 7, wherein the incidence probability and consequence module is further configured to generate a letter grade indicative of the probability and severity of the workplace hazard for the entity.

9. The system of claim 7, wherein the incidence probability and consequence module is further configured to determine a set of new weighting factors, to feed back the set of new weighting factors and to weight each of the module factors using the set of new weighting factors.

10. The system of claim 6 further comprising one or more computing devices each having a display that displays the user interface with the risk score received from the backend.

11. The method of claim 6 further comprising determining, in the incidence probability and consequence prediction module, a set of new weighting factors and feeding back the set of new weighting factors and wherein weighing each of the factors in the incidence probability and consequence prediction module further comprises weighting each of the factors using the set of new weighting factors.

* * * * *